G. D. POGUE.
VARIABLE FEED PUMP.
APPLICATION FILED JULY 19, 1915.
1,204,062.
Patented Nov. 7, 1916.
4 SHEETS—SHEET 4.
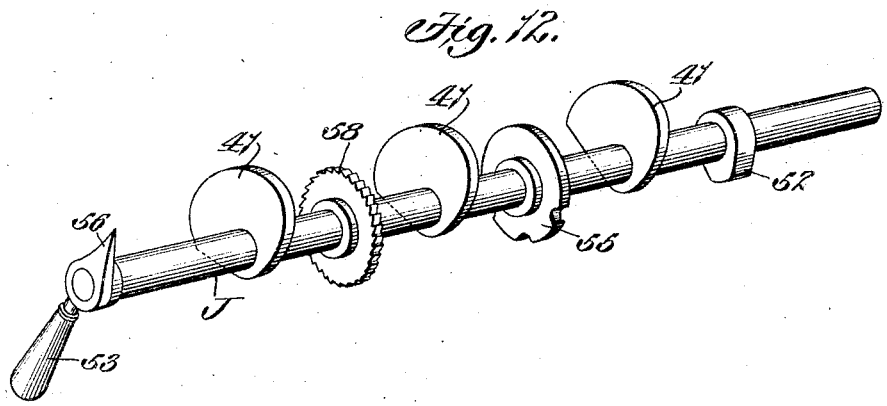
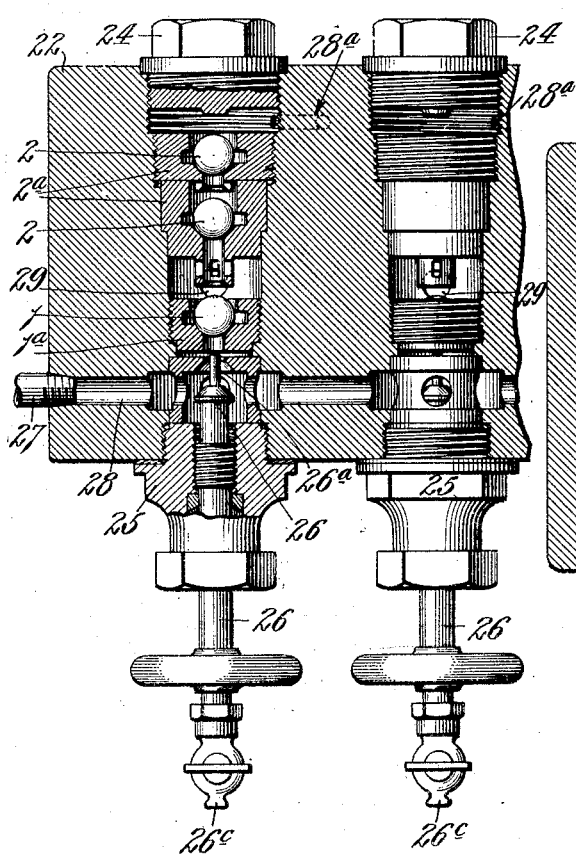
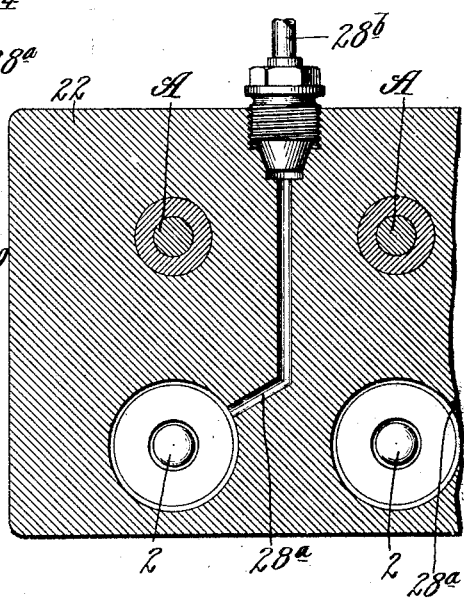
Inventor,
George D. Pogue.
By Bakewell & Cline attys.

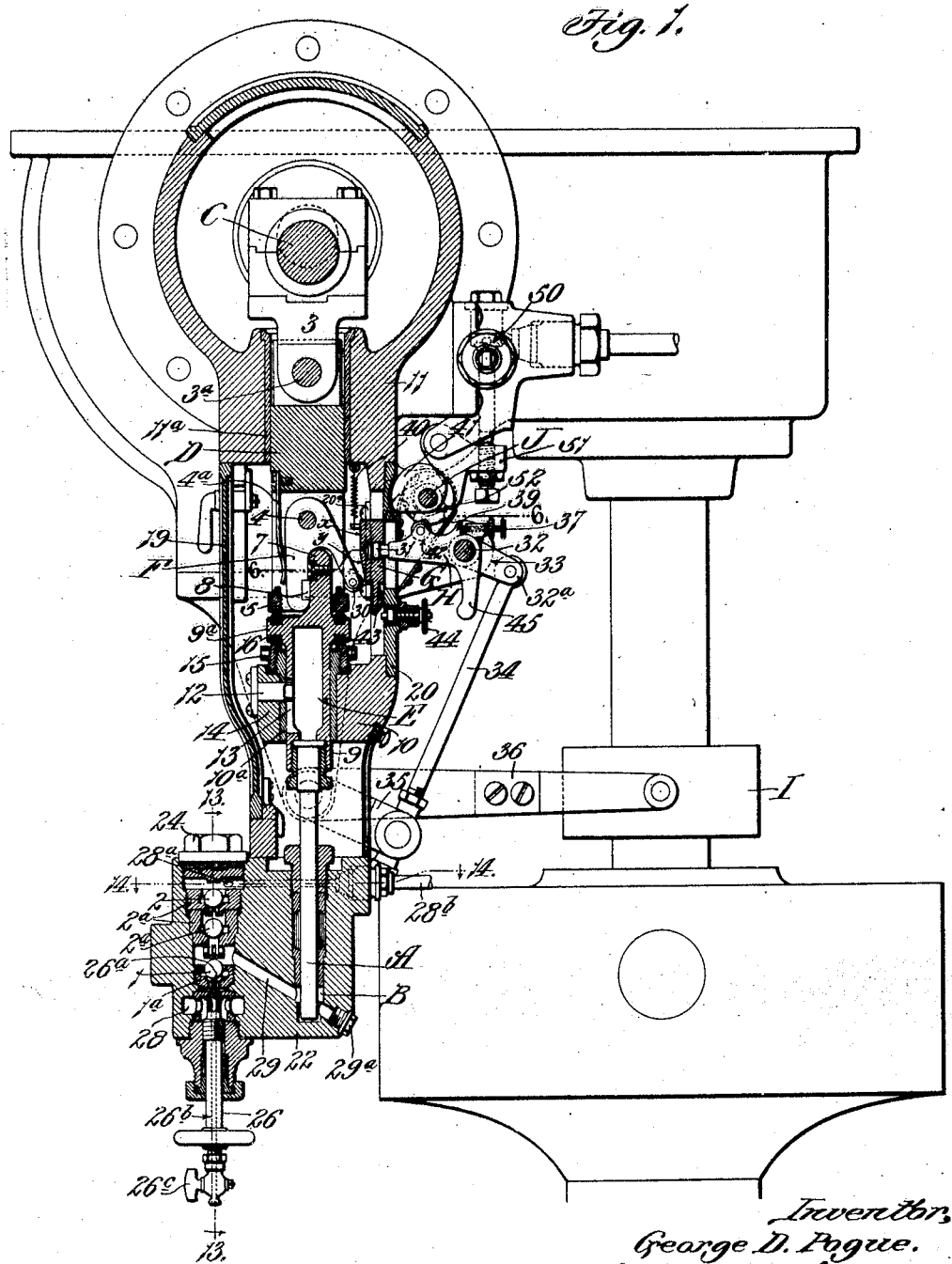

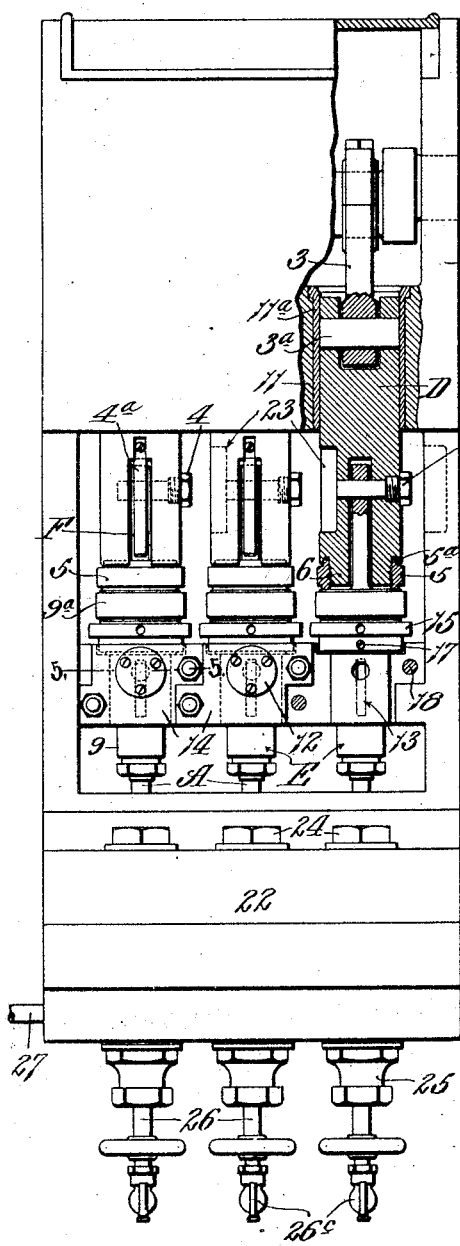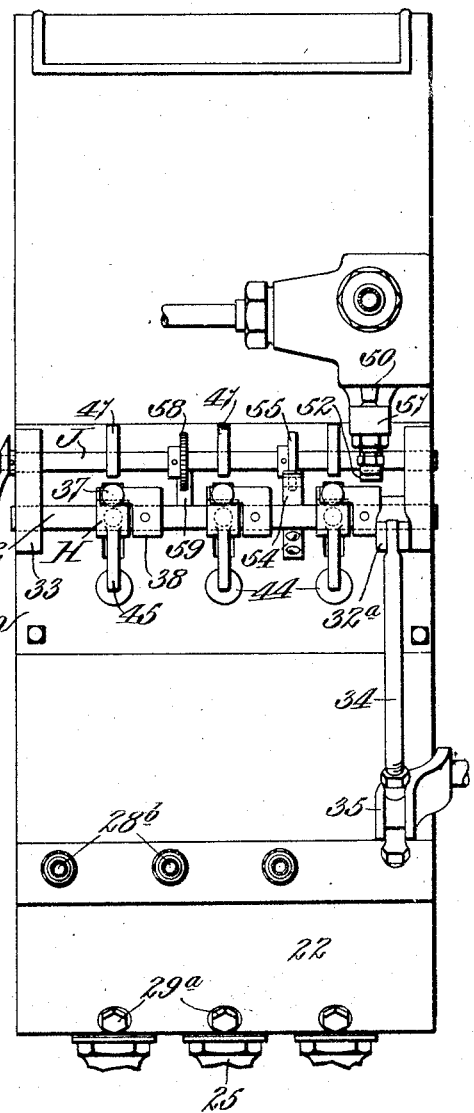

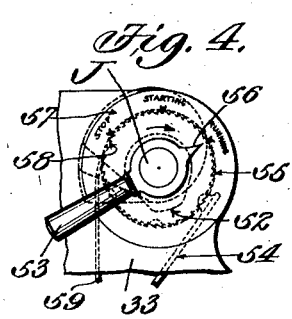
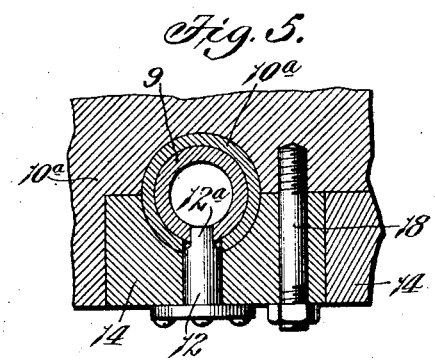
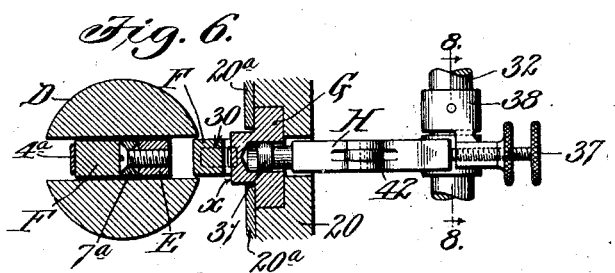
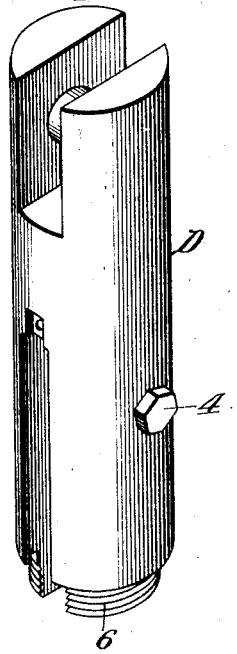
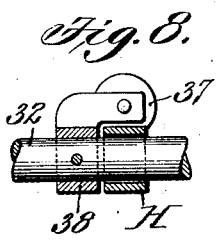
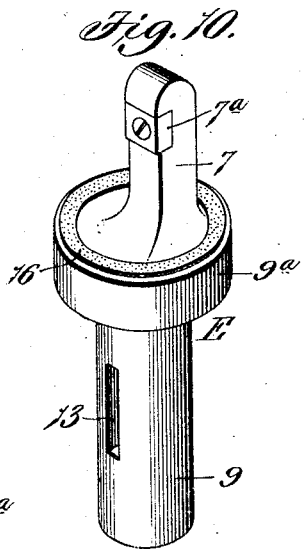
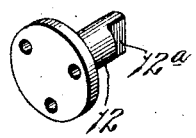

UNITED STATES PATENT OFFICE.

GEORGE D. POGUE, OF ST. LOUIS, MISSOURI.

VARIABLE-FEED PUMP.

1,204,062.

Specification of Letters Patent.

Patented Nov. 7, 1916.

Application filed July 19, 1915. Serial No. 40,678.

*To all whom it may concern:*

Be it known that I, GEORGE D. POGUE, a citizen of the United States, residing at St. Louis, Missouri, have invented a certain new and useful Improvement in Variable-Feed Pumps, of which the following is a full, clear, and exact description, such as will enable others skilled in the art to which it appertains to make and use the same.

This invention relates to variable feed pumps of the type in which the plunger-operating mechanism consists of a fixed-stroke member, a variable-stroke member and an interposed connecting device which is adapted to be tripped or rendered inoperative at different periods in the cycle of operations of the pump, so as to vary the supply from the pump.

One object of my present invention is to provide a strong and serviceable pump of the type referred to, which is so constructed that the supply from same can be accurately controlled.

Another object is to provide a variable feed pump of the type mentioned, in which the connecting device of the plunger-operating mechanism is normally under the control of an automatic means that causes the supply from the pump to vary automatically according to certain conditions, said automatic means being so designed that it can be actuated manually to render the plunger of the pump inoperative without stopping the propelling or driving mechanism of the pump.

Another object is to provide a multi-cylinder pump that comprises independently adjustable, plunger-operating mechanisms controlled from a single automatic governing device and means for enabling one or more cylinders to be cut out of service without affecting the operation of the other cylinders.

Another object is to provide a variable feed multi-cylinder pump that comprises a manually-operated means for rendering all of the cylinders inoperative simultaneously without affecting the propelling or driving means of the pump. And still another object is to provide a multi-cylinder pump which is so constructed that the variable-stroke member of the plunger-operating mechanism of any cylinder can be removed easily without disturbing the plunger-operating mechanisms of the other cylinders.

Other objects and desirable features of my invention will be hereinafter pointed out.

Figure 1 of the drawings is a vertical, transverse-sectional view of a multi-cylinder pump constructed in accordance with my invention. Fig. 2 is a front elevational view of said pump, partly broken away and with the front cover plate removed. Fig. 3 is a rear elevational view of said pump. Fig. 4 is a detail view of the mechanism employed for adjusting the cam shaft and for holding said shaft in adjusted position. Fig. 5 is an enlarged horizontal-sectional view taken on the line 5—5 of Fig. 2. Fig. 6 is an enlarged horizontal-sectional view taken on the line 6—6 of Fig. 1. Fig. 7 is a detail view, showing the head of one of the adjusting screws that forms part of the mechanism for controlling the connecting device of one of the plunger-operating mechanisms. Fig. 8 is a sectional view taken on the line 8—8 of Fig. 6. Fig. 9 is a perspective view of the fixed-stroke member of one of the plunger-operating mechanisms. Fig. 10 is a perspective view of the coöperating variable-stroke member of said mechanism. Fig. 11 is a perspective view of the guide pin that prevents said variable-stroke member from turning. Fig. 12 is a perspective view of the cam shaft that coöperates with the actuating levers for the tripping blocks. Fig. 13 is an enlarged vertical cross-sectional view taken approximately on the line 13—13 of Fig. 1; and Fig. 14 is an enlarged horizontal-sectional view taken approximately on line 14—14 of Fig. 1.

I have herein illustrated my invention embodied in a multi-cylinder variable feed pump which is so designed that the connecting device of each plunger-operating mechanism is tripped automatically sooner or later on the suction stroke of the plunger, so as to vary the degree of movement imparted to the plunger on its displacement stroke, and thus regulate the supply from the cylinder, but I wish it to be understood that my invention is not limited to a multi-cylinder pump or to a pump in which the connecting device of the plunger-operating mechanism is tripped or rendered inoperative on the suction stroke of the plunger, as my invention is applicable to a pump of the general type referred to, in which the connecting device of the plunger-operating mechanism is tripped or rendered inoperative sooner or later on the discharge stroke of the plunger. Furthermore, while I have herein illustrated only one type of connecting device or connecting element for establishing connection between the fixed stroke member and the variable-stroke member of the plunger-operating mechanism and have illustrated only one form of tripping device for rendering said tripping element inoperative, I wish it to be understood that it is immaterial, so far as my broad idea is concerned, what particular kind of connecting element and tripping device are employed, so long as said coöperating parts are so designed and arranged that the variable-stroke member of the plunger-operating mechanism will be automatically disconnected from the fixed-stroke member at such a period in the cycle of operations of the pump that the supply from the pump will vary.

Referring to the drawings, which illustrate the preferred form of my invention, A designates the plungers of a multi-cylinder pump, each of which reciprocates in a cylinder B provided with an inlet valve 1, and one or more discharge valves 2, which will be hereinafter described. A separate and distinct operating mechanism is provided for each of the plungers A and all of said plunger-operating mechanisms are propelled or actuated from a single crank shaft C that is driven by some suitable means, not shown, said shaft C having a plurality of cranks, each of which is connected by means of a connecting link 3 with one of the plunger-operating mechanisms, the cranks on the shaft C either being set at the same angle, as herein shown, so that all of the cylinders will operate simultaneously, or set at different angles so that the cylinders will operate progressively, or one after the other.

While I have stated that the plunger-operating mechanisms are operated by a crank shaft, it will, of course, be understood that it is immaterial what particular means is employed for actuating the plunger-operating mechanisms. Each plunger-operating mechanism consists of a fixed-stroke member or primary actuating member D, a variable-stroke member E and a connecting device F that is interposed between the members D and E so as to impart movement to the variable-stroke member E when the fixed-stroke member D moves in one direction. In the pump herein shown the connecting device F is so arranged that it will move the variable-stroke member when the fixed-stroke member is moving on its suction stroke. On the displacement stroke of the plunger the variable stroke member E is moved positively by the fixed-stroke member D.

The member D, which constitutes the primary actuating member of the plunger-operating mechanism, is preferably cylindrical-shaped, as shown in Fig. 9, and the upper end of same is bifurcated so as to receive the link 3, said parts being pivotally connected together by a pin 3ª, as shown in Figs. 1 and 2. The lower end of the member D is also bifurcated or slotted so as to form a housing for the connecting device F which is pivotally connected thereto by a removable pin 4. The two side parts of the bifurcated portion of the lower end of the member D are connected together by an element 5 so as to produce a strong and rigid structure, the connecting element herein illustrated consisting of a ring 5 screwed onto a screw-threaded portion 6 at the lower end of the member D and provided at its upper end with a vertically-disposed flange 5ª that fits in an annular groove in the lower end of the member D, as shown in Fig. 2.

The variable-stroke member E is arranged in longitudinal alinement with the member D and is provided at its upper end with a hook-shaped portion 7 that projects upwardly into the slot in the lower end of the member D, so that the hook or projection 7ª thereon will coöperate with the hook or projection 8 on the connecting device F, as shown in Fig. 1, the members 7ª and 8 that form said hooks or projections being preferably detachably connected to the parts that carry same, so that they can be renewed easily when they become worn. The variable-stroke member E is provided with a cylindrical shank 9 that fits in a guideway formed in a transverse member 10 of the frame of the pump, and the primary actuating member D also fits in a guideway formed in a transverse member 11 of the frame of the pump that is arranged above the member 10, as shown in Figs. 1 and 2, the guideways in the members 10 and 11 being preferably provided with bushings 10ª and 11ª, respectively. The variable-stroke member E is prevented from rotating or turning in its guideway by means of a pin 12 whose shank has a reduced extension 12ª that projects into a vertically-disposed slot 13 in the cylindrical portion 9 of the member E, said pin 12 being carried by a removable retaining member 14 that is detachably connected to the frame member 10. In addition to preventing the member E from turning, the pin 12 also serves to hold the bushing 10ª in operative position. The plunger A is securely connected to the lower end of the variable-stroke member E in some suitable manner, so that it will be moved positively upwardly and downwardly by the member E.

On the displacement stroke of the primary actuating member D the ring 5 at the lower end of said member bears upon a head 9ª on the variable-stroke member E, and thus positively moves the plunger A downwardly.

On the return stroke or upward stroke of the primary actuating member D, the connecting device F thereon, which is normally held in engagement with the hook-shaped portion at the upper end of the variable-stroke member E by means of a spring $4^a$, causes the member E to move upwardly until the connecting device F is tripped by a means that will be hereinafter described.

While it is not absolutely essential to the successful operation of my invention that the device 5 at the lower end of the primary actuating member D be made adjustable, still, I prefer to make said device adjustable, so as to enable the relative positions of the members D and E to be changed, and thus insure proper coöperation of the connecting device F with the hook-shaped portion on the variable-stroke member E without undue lost motion. An adjustable abutment 15 is preferably provided for arresting the movement of the variable-stroke member E on the displacement stroke of the plunger, so as to prevent the member E from over-shooting, or, in other words, from being carried by its momentum or by any other force to a position where the hook-shaped portion at the upper end of same will not engage the connecting device F on the suction stroke of the plunger-operating mechanism, the abutment 15 herein shown consisting of a ring which is screwed onto the upper end of the bushing $10^a$ or to some other suitable part of the stationary frame of the machine. If desired, rings 16 of fiber or some other suitable resilient material can be arranged on the top and bottom faces of the head $9^a$ on the variable-stroke member E, so as to coöperate with the ring 5 on the lower end of the member D and with the adjustable stop 15, and thus quiet the operation of the mechanism and minimize the shocks produced when the coöperating parts of same come together. The adjustable stop or buffer 15 is preferably provided with a set screw 17, or some other suitable means, to hold it in position, and if desired, shims can be arranged between the buffer 15 and some stationary part of the frame so as to prevent the screw-threads on said buffer from being subjected to undue stresses. In order that any one of the variable-stroke members E may be removed without disturbing the other variable-stroke members, I have provided the transverse member 10 of the frame with a plurality of retaining caps or devices 14, each of which forms one-half of the guideway for one of the variable-stroke members E, as shown in Fig. 5, said caps 14 being secured to the cross member 10 of the frame by screw-threaded studs 18 or other suitable retaining devices, the lugs or portions of the caps 14 through which the retaining devices 18 pass, being staggered, as shown in Fig. 2, so as to enable each cap to be made large enough and strong enough to form a serviceable guideway for the particular variable-stroke member with which it coöperates. The space between the transverse members 10 and 11 is closed at the front by a removable cover plate 19, as shown in Fig. 1, and at the rear of said space is a cover plate 20 which carries certain elements of the tripping mechanism with which the connecting devices F coöperate. The vertical side pieces 21 and the transverse cross members 10 and 11 of the frame can be formed from cast iron, but the portion in which the cylinders B are formed preferably consists of a steel member 22 that is secured in any suitable manner to the frame of the pump and which is arranged horizontally under the cross member 10 of the frame, as shown in Figs. 1 and 2. In order to secure compactness of design and at the same time make it possible to remove the connecting device F of one of the plunger-operating mechanisms without disturbing the other plunger-operating mechanisms, a slot or cut-out portion 23 is formed in one side of each of the primary actuating members D, as shown in Fig. 2, so as to enable the pins 4 on which the connecting devices F are mounted to be backed out far enough to release said devices without dismantling the machine or removing the plunger-operating mechanism.

The inlet and discharge valves of the pump are of the construction disclosed in my pending application Serial No. 77,629, filed February 11, 1916, and are so designed that the valves of any cylinder of the pump can be removed easily without cutting the other cylinders of the pump out of operation. Said valves are also so constructed that the passageway between the inlet and discharge valves of any cylinder can be drained without removing the valves. As shown in Figs. 1, 13 and 14, each cylinder is provided with an inlet valve 1 and two discharge valves 2, said valves being of the ball type and arranged in vertical alinement with each other, preferably in front of the cylinder B in a vertically-disposed hole or opening in the member 22. The upper end of the opening in the member 22, in which the valves of one cylinder are arranged, is closed by a removable cap 24 and the lower end of said opening is closed by a removable cap 25 which carries a manually-operated valve 26. The inlet valve 1 is provided with a cage $1^a$ that is screwed into the member 22, and the discharge valves 2 are both provided with separate cages $2^a$, the bottom one being seated in a pocket in the member 22 and the top one being screwed into the member 22. The inlet and discharge valves of all of the cylinders are arranged in transverse alinement with each other, preferably in front of the cylinders, and a supply pipe 27 leads to a channel 28 in the member 22 that is common to all of the cylinders, or, in other words, which supplies the fuel or other liquid being pumped to all of the cylinders. A duct 29 leads from each of the cylinders B to the passageway between the inlet and discharge valves of said cylinder and at the lower end of said duct is a removable closure 29ª, as shown in Fig. 1, that enables said duct and cylinder to be cleaned. Horizontally-disposed discharge ducts 28ª that are formed in the member 22 between the cylinders B, as shown in Fig. 14, lead from the discharge valves of the respective cylinders to discharge pipes 28ᵇ.

The manually-operated valve 26 previously mentioned is provided with a stem which is so constructed that when it is screwed upwardly into the position shown in Fig. 1 no fuel can pass from the channel 28 into the particular cylinder with which said valve 26 coöperates. The stem of said valve 26 is provided at its upper end with an extension 26ª, shown in Fig. 1, that unseats the inlet valve 1 when said valve 26 is closed, and thus permits the contents of the passageway between the inlet and discharge valves to escape through a duct 26ᵇ that is formed in the stem of said valve, the valve 26 being provided with a pet cock or other suitable device 26ᶜ, that controls the duct in the stem of the valve.

If it is desired to examine or clean the valves of a certain cylinder, this can be accomplished without cutting the other cylinders out of operation by merely closing the valve 26 so as to cut off the supply of fuel to that particular cylinder, and if it is desired to drain the passageway between the inlet and discharge valves of a certain cylinder without removing said valves, this can be effected by merely closing the valve 26 and opening the pet cock 26ᶜ at the lower end of said valves, so as to permit the contents of said passageway to escape through the hollow stem of the valve. A pump provided with valves of the construction and arrangement above described can be manufactured at a low cost; it is very compact, the discharge pipes can be arranged conveniently and the valves of any cylinder can be removed or inspected without stopping the pump or the machine that the pump is supplying the liquid to, thus making the pump particularly adapted for use with an internal combustion engine, owing to the fact that it is not necessary to stop the engine when one cylinder of the pump gets out of order.

The mechanism for governing the supply from the pump consists of a plurality of tripping devices that trip the connecting devices F or cause said connecting devices to be rendered inoperative sooner or later on the suction stroke of the plunger-operating mechanisms. A tripping device is provided for the plunger-operating mechanism of each cylinder, and all of said tripping devices are under the control of an automatic governing device. When my improved pump is used in connection with an internal combustion engine for feeding fuel to the cylinders of the engine, the means that controls said tripping devices will be operatively connected with the governor of the engine, so as to cause the connecting devices F of the respective cylinders to be tripped sooner or later on the suction strokes of the plungers, according to the speed of the engine, thus causing varying quantities of fuel oil to be drawn into the cylinders of the pump and thereafter fed to the cylinders of the engine on the displacement stroke of the plungers. In order that the plunger-operating mechanism of one cylinder may be rendered inoperative, so as to cut one cylinder of the pump out of service, without affecting the other cylinders, I have constructed the actuating mechanism for the tripping devices in such a manner that the operator in charge of the pump can cause the connecting device of one plunger-operating mechanism to be held in an inoperative position without disturbing or affecting the operation of the other plunger-operating mechanisms. I have also constructed said mechanism in such a manner that all of the tripping devices can be moved simultaneously into such a position that all of the plunger-operating mechanisms are maintained in an inoperative condition.

In various types of internal combustion engines with which my improved pump can be used successfully it is customary to start the engine by means of compressed air, an electric motor or some other suitable source of power, and then throw the fuel supply pump into operation, so as to feed fuel to the cylinders after the engine has reached normal speed. In order that this may be effected easily I have provided my pump with a controlling means that governs the medium used to start the engine and also governs the pump, said means being so constructed that the pump will come into operation automatically and supply liquid fuel to the cylinders of the engine after the starting means has been cut off or rendered inoperative. I have not herein claimed this feature of my invention, as it forms the subject-matter of my pending application Serial No. 77628, filed Feb. 11, 1916.

The tripping devices of the pump herein shown consist of sliding blocks G that coöperate with friction rolls 30 on rearwardly-projecting arms on the connecting devices F in such a manner that each of said devices F will be disengaged from its coöperating variable-stroke member before the primary actuating member D that carries said device reaches its upper limit of movement. The blocks G are slidingly mounted in slots or guideways in the plate 20 and are retained in operative position in said plate by means of keepers or cover plates 20ᵃ, as shown in Figs. 1 and 6. Each of said blocks has a flat surface x that lies parallel to the axis of the main moving parts and also an inclined or oblique surface y, as shown in Fig. 1, the position of said surfaces being such that the friction roll 30 of each connecting device F will travel over the inclined surface y of its coöperating tripping block and then onto the surface x on said block during the upward stroke of the primary actuating member D, the movement that is imparted to the connecting device F, by reason of the roll 30 thereon coming into engagement with the tripping block G causing said connecting device F to be automatically disengaged from the variable-stroke member with which it coöperates. Each of the tripping blocks G is provided with an actuating lever H which is connected to same by means of a ball-shaped, or substantially ball-shaped, head 31 on the lever that projects into a cylindrical hole in the rear side of the block. The levers H are mounted on a rock shaft 32 which extends transversely of the pump and which is mounted in bearings 33 on the plate 20 or some other suitable part of the frame. When the pump is used in connection with an internal combustion engine for feeding fuel oil to the cylinders of the engine, the rock shaft 32 will be operatively connected with the automatic governor of the engine in such a manner that the position of said rock shaft will change when the collar I of the governor moves up and down, owing to variations in the speed of the engine, the means herein illustrated for transmitting movement from the governor collar I to the rock shaft 32 consisting of an arm 32ᵃ on the rock shaft 32, and a link 34 that joins said arm to a lever 35 on a rock shaft which is provided with a rock arm 36 that is connected to the governor collar I, as shown in Fig. 1. The actuating levers H are loosely mounted on the rock shaft 32, and adjustable means are provided for determining the position of said levers with relation to said shaft, said means preferably consisting of adjusting screws 37 mounted in lugs formed on rigid collars 38 on said shaft and coöperating with stops or shoulders 39 on said actuating levers H. Each of the tripping blocks G is under the influence of a spring 40 which tends to move said block upwardly, and thus cause the projection 39 on its coöperating actuating lever to bear against the adjusting screw 37, as shown in Fig. 1. By adjusting the screw 37 the position of the tripping block that coöperates with said screw can be changed relatively to the governor-controlled shaft 32 that operates the lever H. In a multi-cylinder pump the relative amount of fuel supplied by any cylinder may be increased or decreased by changing the position of the adjusting screw 37 that coöperates with said cylinder. To facilitate the adjustment of the pump the screws 37 are provided with heads of the character indicated in Fig. 7, each of said heads having the word "Increase" and an arrow or some other suitable indicia thereon, so as to indicate that a turn of the screw to the right will increase the supply from the cylinder with which said screw coöperates, and also having the word "Decrease" and an arrow or some other suitable indicia thereon, so as to indicate that a turn of the screw to the left will cause the supply from the cylinder to be decreased. Various other means could, of course, be employed for changing the positions of the actuating levers H with relation to the governor-controlled rock shaft 32 that imparts movement to said levers. Therefore, I do not wish it to be understood that my invention is limited to the particular means herein illustrated. Furthermore, it is immaterial what particular form of mechanism is employed for actuating the tripping blocks, but I prefer to use a mechanism of substantially the construction shown, because it comprises comparatively few parts that can be easily assembled and adjusted, which parts are of such a design that lost motion is reduced to a minimum.

A cam shaft J that extends transversely across the frame of the pump in proximity to the rock shaft 32 is provided with a plurality of cams 41 that coöperate with the actuating levers H and move them downwardly into such a position that all of the connecting devices will be held out of engagement with the variable-stroke members E with which they coöperate, each actuating lever H being preferably provided with a friction roll 42 that is arranged in such a position that it will be engaged by its coöperating cam 41 when the cam shaft J is turned into a certain position.

In addition to the means just described for holding the connecting devices F in an inoperative position, I have provided each of the tripping blocks H with a hook 43 that is adapted to be engaged by a spring-pressed plunger 44, shown in Fig. 1, when the tripping block is moved downwardly below its normal position, by pulling on the handle 45 of the lever H that actuates said tripping block. If it is desired to cut one of the cylinders of the pump out of commission without affecting the remaining cylinders, the operator in charge of the pump grasps the handle 45 of the actuating lever H that coöperates with the tripping block of the cylinder that it is desired to render inoperative and pulls said handle rearwardly far enough to cause the hook 43 at the lower end of the tripping block to be engaged by the spring-pressed plunger 44. Thereafter, the variable-stroke member of the plunger-operating mechanism with which said block coöperates will remain at rest while the other plungers of the pump continue in operation.

The cam shaft J is also utilized to govern a medium that is employed to start the engine with which the pump is used. During the interval it is required to bring the engine from rest up to approximately normal speed it is desirable to stop the delivery of fuel to the cylinders of the pump, otherwise abnormal pressures might be developed within the cylinders, which would subject the frame, shaft and related parts to dangerous stresses. After the engine has been brought up to approximately normal speed it is, of course, desirable to cut off or render inoperative the medium that started the engine and throw the pump into service in the shortest possible time, so as to not lose the momentum stored up in the fly wheel of the engine between the time when the starting medium is discontinued and the introduction of fuel into the cylinder begins. It is, of course, also desirable to have these two separate connections so interlocked that they cannot possibly occur at the same time. My improved pump is so designed that it accomplishes the desirable features above mentioned, for, as previously stated, the cam shaft J that renders the tripping blocks inoperative is also utilized to govern the medium which starts the engine. In case compressed air is used as the medium to start the engine, a valve 50 that governs the supply of compressed air is combined with a valve-operating device 51 that is under the control of a cam 52 on the cam shaft J. When said cam shaft J is in such a position that the cams 41 thereon hold the tripping blocks G depressed or in such a position that the connecting devices F of the plunger-operating mechanisms are rendered inoperative, the cam 52 on said cam shaft J will permit the valve 50 or other device that controls the starting medium to remain open or in an operative condition. While the engine is building up speed, or while it is being driven by the starting medium, the primary actuating members D of the plunger-operating mechanisms reciprocate back and forth, if the crank shaft C is connected with the engine, but the plungers in the pump cylinders remain at rest. Consequently, no fuel is drawn into the pump cylinders. After the engine has reached approximately normal speed, the cam shaft J is turned in such a direction that the cam 52 thereon will close the valve 50, and thus cut off the starting medium, the continued movement of the cam shaft in this direction causing the cams 41 thereon to be moved out of engagement with the actuating levers H, so that said levers and their coöperating tripping blocks can move upwardly far enough to release the connecting devices F, and thus cause said devices to impart movement to the variable-stroke members E of the plunger-operating mechanisms.

The cam shaft J is provided at one end with a handle 53 for turning said shaft, and means are provided for locking said cam shaft in adjusted position, one means that may be used for this purpose consisting of a spring-actuated locking device 54, shown in Fig. 4, that coöperates with a notched disk 55 on the cam shaft. If desired, the handle 53 can be provided with a pointer 56 that travels over a dial 57 provided with the words "Stop", "Starting" and "Running", or other suitable indicia, so as to assist the operator in adjusting the cam shaft J. When the pointer 56 stands at the word "Stop" the cams 41 on the cam shaft J will hold the actuating levers H in their depressed position, and thus maintain the connecting devices F in an inoperative condition. When the cam shaft J is in this position the plungers of the pump remain at rest, even though the primary actuating members of the plunger-operating mechanisms are set in motion. When the cam shaft J is turned into such a position that the pointer 56 stands opposite the word "Starting" on the dial, the cam 52 on said shaft permits the valve 50 to open, and thus causes the engine to be started by the medium which said valve controls, the cams 41 being so arranged that they still hold the actuating levers H in their depressed position, and thus prevent the variable-stroke members of the plunger-operating mechanisms from moving when the primary actuating members D are set in motion by the starting of the engine.

After the engine has reached approximately normal speed, the cam shaft J is turned in such a direction that the pointer 56 travels toward the word "Running" on the dial 57. During the first part of this movement of said shaft the cam 52 thereon closes the valve 50, and thus cuts off the starting medium, and during the latter part of the movement of the cam shaft the cams 41 thereon release the actuating levers H, and thus permit the connecting devices F to become operative for connecting the primary actuating members and the variable-stroke members of the plunger-operating mechanisms together. If desired, the cam shaft J can be provided with a ratchet wheel 58 that coöperates with a pawl 59, so as to prevent said cam shaft from being turned in the wrong direction, or, in other words, prevent the several functions just mentioned from being performed in an improper sequence after the engine has been started by the starting medium. In some instances it may be desirable to arrange the cams 41 in the cam shaft J in such a manner that one or more of the pump plungers will remain in action while the engine is being started by an external starting force. It is, of course, immaterial, so far as my broad idea is concerned, what particular medium is used to start the engine, and while I have herein illustrated an air line and a controlling valve for starting the engine, it will be obvious that various other means could be used for this purpose comprising a controlling device whose position is determined by the cam shaft J or by the means that effects the manual adjustment of the tripping blocks.

Having thus described my invention, what I claim, and desire to secure by Letters Patent is:—

1. A variable-stroke pump provided with a plunger-operating mechanism that comprises a fixed-stroke actuating member, a variable-stroke member, a connecting means for imparting movement to said variable-stroke member when said actuating member moves in one direction, a tripping means for rendering said connecting means inoperative, an automatic controlling means that normally governs said tripping means, and an independent means for moving said tripping means relatively to said automatic controlling means so as to enable said tripping means and said connecting means to be rendered inoperative without affecting the operation of said actuating member and said automatic controlling means.

2. A variable feed pump provided with a plunger-operating mechanism that comprises a fixed-stroke actuating member, a variable-stroke member and an interposed connecting device, a tripping device for rendering said connecting device inoperative sooner or later on one stroke of said plunger-operating mechanism, an automatic controlling means that normally governs the position of said tripping device, and a manually-operated means for enabling said tripping device to be retained in such a position that said connecting device will be held in an inoperative condition while said actuating member continues in operation.

3. A variable feed pump, comprising a plurality of cylinders, a plunger-operating mechanism coöperating with each cylinder, each of said mechanisms comprising a variable-stroke member, an automatic controlling means comprising tripping devices that govern the degree of movement of said variable-stroke members, and means whereby any one of said tripping devices may be held at rest so as to cause the particular cylinder with which it coöperates to be cut out of service while the remaining cylinders continue in operation.

4. A variable-stroke pump provided with a plurality of cylinders, a plunger-operating mechanism coöperating with each cylinder and each consisting of a fixed-stroke actuating member, a variable-stroke member and an interposed connecting device, tripping devices that coöperate with said connecting devices for controlling the degree of movement imparted to said variable-stroke members, an automatic governing means that controls the operation of all of said tripping devices, and means for enabling any one of said tripping devices to be adjusted so as to vary the supply from the particular cylinder with which it coöperates without affecting the operation or position of the other tripping devices.

5. A variable feed pump, comprising a plurality of cylinders, a controlling device for each cylinder that governs the supply from the cylinder and which forms part of the plunger-operating mechanism, an automatically-operating governing means that is common to all of said controlling devices and which determines the position of same, and means for enabling any of said controlling devices to be adjusted independently of the others and relatively to said automatic governing means.

6. A variable feed pump provided with a plunger-operating mechanism that comprises a variable-stroke member, a fixed-stroke member that moves said variable-stroke member positively in one direction, an interposed connecting device on said fixed-stroke member that engages said variable-stroke member and moves it in the opposite direction, a tripping member that acts directly on said connecting device and trips it sooner or later on one stroke of the plunger-operating mechanism so as to vary the supply from the pump, an actuating means for said tripping member, an operating means for said actuating means, and means for enabling said actuating means to be adjusted relatively to the means that operates same.

7. A variable feed pump provided with a plunger-operating mechanism that comprises an element which is adapted to be tripped or rendered inoperative sooner or later on one stroke of said mechanism so as to vary the supply from the pump, a tripping device that controls said element, an actuating lever for said tripping device, an automatically-operating rock shaft on which said lever is loosely mounted, and a manually-adjustable means for determining the position of said lever with relation to said shaft.

8. A variable feed pump provided with a plunger-operating mechanism that comprises an element which is adapted to be tripped or rendered inoperative so as to vary the supply from the pump, a slidable tripping device for controlling said element, and an actuating lever for said tripping device connected to same by a ball and socket connection.

9. A variable feed pump provided with a plunger-operating mechanism that comprises an element which is adapted to be tripped or rendered inoperative so as to vary the supply from the pump, a slidable tripping device for controlling said element, an actuating lever provided with a substantially ball-shaped portion that fits in an opening in said tripping device, an operating shaft on which said lever is mounted, and an adjustable means for determining the position of said lever with relation to said shaft.

10. A variable feed pump provided with a plunger-operating mechanism that comprises an element which is adapted to be tripped or rendered inoperative so as to govern the supply from the pump, a device for tripping said element, an actuating member for imparting movement to said tripping device, an automatically-operating means for moving said actuating member and tripping device in one direction and having a part against which said actuating member normally bears, and means which tends to hold said actuating member in engagement with said part.

11. A variable feed pump provided with a plunger-operating mechanism that comprises an element which is adapted to be tripped or rendered inoperative so as to govern the supply from the pump, a device for tripping said element, a governor-controlled shaft, a member loosely mounted on said shaft and operatively connected to said tripping device for actuating same, an adjustable means for determining the position of said member on said shaft, and a resilient means for holding said member in engagement with said adjustable means.

12. A variable feed pump provided with a plurality of cylinders, plunger-operating mechanisms for said cylinders, each of which comprises an element that is adapted to be tripped or rendered inoperative so as to vary the supply from the cylinder, independent tripping devices coöperating with said elements, an actuating lever for each of said tripping devices, an automatically-operating rock shaft on which said levers are mounted, and means for enabling any of said levers to be adjusted relatively to said rock shaft without changing the position of the other levers.

13. A variable feed pump provided with a plunger-operating mechanism that comprises an element which is adapted to be tripped or rendered inoperative so as to vary the supply from the pump, a tripping device coöperating with said element, an automatic governing means for changing the position of said tripping device, a manually-operated means for moving said tripping device away from its normal position, and means for locking said device in an inoperative position.

14. A variable feed pump provided with a plunger-operating mechanism that comprises a trippable element, a slidable controlling device coöperating with said element for governing the supply from the pump, an actuating lever for said controlling device, an automatic governing means for imparting movement to said lever, a manually-operable means for moving said lever into a certain position when it is desired to cause the supply from the cylinder with which it coöperates to cease, and means that directly engages said controlling device and holds it in an inoperative position after said lever has been actuated manually.

15. A variable feed pump provided with a plunger-operating mechanism that comprises a primary actuating member, a variable-stroke member and an interposed connecting device, a tripping device coöperating with said connecting device consisting of a block that is slidably mounted in a guide-way which extends parallel to said variable-stroke and fixed-stroke members, an actuating lever that passes through a slot in said guide-way and which is operatively connected to said block, and a spring-actuated retaining device that coöperates with a shoulder on one end of said block to hold said block in an inoperative position.

16. A multi-cylinder pump provided with plunger-operating mechanisms, each of which comprises a connecting device that is adapted to be tripped sooner or later on one stroke of the pump, tripping devices that coöperate with said connecting devices, automatically-operating actuating levers that govern the position of said tripping devices, and a cam shaft common to all of said actuating levers that is adapted to be moved manually when it is desired to hold the connecting devices of all of the plunger-operating mechanisms in an inoperative condition.

17. A variable feed pump provided with a plunger-operating mechanism that comprises a primary actuating member and a variable-stroke member that is operated in one direction by said actuating member, an adjustable means for arresting the movement of said variable-stroke member in one direction, and a variable means for governing the movement of said variable-stroke member in the opposite direction.

18. A variable feed pump provided with a plunger-operating mechanism that comprises a primary actuating member and a variable-stroke member that is moved positively in one direction by said actuating member, an adjustable abutment against which said variable-stroke member strikes when it is moved positively by said actuating member, and a variable means for coupling said members together on the return stroke of the primary actuating member.

19. A variable feed pump provided with a plunger-operating mechanism that comprises a variable-stroke member, a fixed-stroke member that strikes same and moves it in one direction, a stationary part on which said variable-stroke member slides, an adjustable abutment on said stationary part for arresting the movement of said variable-stroke member in one direction, and a variable means for coupling said members together on the return stroke of the mechanism.

20. A variable feed pump provided with a plunger-operating mechanism that comprises a fixed-stroke member, a variable-stroke member, an adjustable element on one of said members that is adapted to engage the other member and thus transmit movement to said variable-stroke member when said fixed-stroke member moves in one direction, and an independent means for connecting said members together when the fixed-stroke member moves in the opposite direction.

21. A plunger-operating mechanism for a variable feed pump, comprising a fixed-stroke member, a variable-stroke member, an adjustable element on said fixed-stroke member that is adapted to bear against said variable-stroke member, and a connecting device interposed between said members that is adapted to be tripped sooner or later on one stroke of said mechanism.

22. A plunger-operating mechanism for variable feed pumps, comprising a fixed-stroke member having a bifurcated portion, an element that joins the side parts of said bifurcated portion together, a variable-stroke member having a part that projects through an opening in said element, and a trippable connecting device in the bifurcated portion of said fixed-stroke member that is adapted to engage said variable-stroke member.

23. A plunger-operating mechanism for pumps, comprising a fixed-stroke member having a bifurcated portion, a pivotally mounted connecting device arranged in said bifurcated portion, a ring screwed onto the bifurcated portion of said member for joining the side parts of same together, and a variable-stroke member having a part that projects through said ring so that it will coöperate with said connecting device.

24. A plunger-operating mechanism for pumps, comprising a fixed-stroke member having a bifurcated portion, a pivotally mounted connecting device arranged in said bifurcated portion, an adjustable element that joins the side parts of said bifurcated portion together, a variable-stroke member provided with a portion that coöperates with said connecting device and having a head that bears against said adjustable element, and an abutment against which the head on said variable-stroke member strikes when said member moves in one direction.

25. A variable feed pump provided with a plunger-operating mechanism that comprises a reciprocating variable-stroke member of cylindrical shape in cross section, a guideway through which said member passes, said guideway having a removable portion, and a stationary device on said removable portion that projects into an elongated slot in said variable-stroke member.

26. A variable feed pump provided with a plunger-operating mechanism that comprises a reciprocating variable-stroke member of cylindrical shape in cross section, a guideway through which said member passes; a stationary device in said guideway that projects into an elongated slot in said variable-stroke member, and a removable bushing in said guideway surrounding said variable-stroke member and provided with an opening through which said device passes.

27. A multi-cylinder pump provided with a plurality of plunger-operating mechanisms, each of which comprises a variable-stroke member, and guideways for said members each of which is split longitudinally and in such a manner that one member can be removed laterally from its guideway without disturbing the others.

28. A multi-cylinder pump provided with a plurality of plunger-operating mechanisms, each of which comprises a reciprocating variable-stroke member, a stationary part through which said members slide, and a plurality of removable retaining devices on said stationary part, each of which forms a segmental portion of a guideway for one of said variable-stroke members.

29. In a multi-cylinder pump, a transversely-disposed frame member, a plurality of reciprocating parts arranged in parallel relation to each other in said frame member, and a plurality of removable bearings on said frame member that confine said reciprocating parts in position, said bearings having laterally-projecting offset or staggered portions through which fastening devices pass, thereby enabling the bearing for any one of said reciprocating parts to be removed without disturbing the remaining parts.

30. A multi-cylinder pump, comprising a frame provided with two spaced, transversely-disposed portions, a plunger-operating mechanism comprising a fixed-stroke member reciprocatingly mounted in one portion of said frame and a variable-stroke member reciprocatingly mounted in the other portion of said frame, a removable cover plate that forms a closure for one side of the opening between the spaced portions of said frame, a plate that forms a closure for the other side of said opening, and devices carried by the said last mentioned plate that form part of a mechanism for controlling the supply from the pump.

In testimony whereof I hereunto affix my signature in the presence of two witnesses, this seventeenth day of July, 1915.

GEORGE D. POGUE.

Witnesses:
WELLS L. CHURCH,
GEORGE BAKEWELL.